United States Patent
Sullivan et al.

(10) Patent No.: US 7,767,078 B2
(45) Date of Patent: Aug. 3, 2010

(54) SYSTEM FOR TREATING PRODUCED WATER

(75) Inventors: Enid J. Sullivan, Los Alamos, NM (US); Lynn Katz, Austin, TX (US); Kerry Kinney, Austin, TX (US); Robert S. Bowman, Lemitar, NM (US); Soondong Kwon, Kyungbuk (KR)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/202,007

(22) Filed: Aug. 29, 2008

(65) Prior Publication Data

US 2009/0101572 A1 Apr. 23, 2009

Related U.S. Application Data

(60) Provisional application No. 60/999,463, filed on Oct. 17, 2007.

(51) Int. Cl.
*C02F 3/00* (2006.01)

(52) U.S. Cl. .................... 210/150; 210/151; 210/220; 210/269; 210/416.1

(58) Field of Classification Search ......... 210/150–151, 210/220, 269, 416.1
See application file for complete search history.

(56) References Cited

U.S. PATENT DOCUMENTS

| | | | | |
|---|---|---|---|---|
| 4,457,854 A | * | 7/1984 | Gangwisch et al. | 510/356 |
| 5,254,253 A | * | 10/1993 | Behmann | 210/607 |
| 2004/0108274 A1 | * | 6/2004 | Schulze-Makuch et al. | 210/660 |
| 2007/0102359 A1 | | 5/2007 | Lombardi et al. | |
| 2007/0181502 A1 | * | 8/2007 | Johnson et al. | 210/656 |
| 2007/0210006 A1 | * | 9/2007 | Rayalu et al. | 210/683 |

OTHER PUBLICATIONS

In-Soung Chang et al.; 2002; "Air sparging of a submerged MBR for municipal wastewater treatment"; Process Biochemistry 37 (2002) 915-920.*
Brookes, et al., "Fouling of Membrane Bioreactors During Treatment of Produced Water," Proceedings of International Membrane Science and Technology Conference; Sydney, Australia, 2003, pp. 1-7.
Sullivan et al., "Water Treatment Technology for Oil and Gas Produced Water," 2004, pp. 216-225.
International Search Report for PCT/US08/80262, International Searching Authority, May 5, 2009, pp. 1-9.

* cited by examiner

*Primary Examiner*—Chester T Barry
(74) *Attorney, Agent, or Firm*—Samuel L. Borkowsky; Samuel M. Freund

(57) ABSTRACT

A system and method were used to treat produced water. Field-testing demonstrated the removal of contaminants from produced water from oil and gas wells.

11 Claims, 11 Drawing Sheets

US 7,767,078 B2

SYSTEM FOR TREATING PRODUCED WATER

STATEMENT OF RELATED CASES

This patent application claims the benefit of U.S. Provisional Patent Application Ser. No. 60/999,463, filed on Oct. 17, 2007, the contents of which are hereby incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to water purification and more particularly to a system and method for treating produced water.

BACKGROUND

The extraction of oil and gas ("O&G") generates large volumes of contaminated water that is referred to in the O&G industry as "produced water". Most produced water is contaminated with inorganic salts, metals, organic compounds, and other materials. The most abundant hydrocarbons in produced water include semivolatile organic compounds ("SVOCs") and volatile organic compounds ("VOCs"). Volatile organic compounds typically include dissolved benzene, toluene, ethylbenzene, and xylenes, collectively referred to as "BTEX". Other organic constituents in produced water include organic acids, oils, paraffins, and waxes. Volatile inorganic constituents include hydrogen sulfide.

In 1995, the volume of produced water generated from onshore wells throughout the United States of America ("US") was approximately 17.9 trillion barrels. Normal disposition of produced water is by reinjection into deep rock formations. O&G companies pay to have produced water transported to disposal sites for reinjection. This expensive and time-consuming activity can represent 10 percent of the total cost of hydrocarbon production. Otherwise, regulations require that produced water be treated before it is released into surface water or reused. Current methods for treating produced water are expensive.

SUMMARY OF THE INVENTION

In accordance with the purposes of the present invention, as embodied and broadly described herein, the present invention includes a system for treating produced water. The system includes a first reactor for separating organic materials from the produced water. The first reactor generates from the produced water an organic fraction and a contaminated first aqueous fraction. The first reactor includes surface modified zeolite. The organic fraction includes volatile organic materials that are discharged from first reactor. The system also includes a membrane bioreactor in fluid communication with the first reactor. The membrane bioreactor treats the contaminated first aqueous fraction. The product from the membrane bioreactor is a first treated water product. The system also includes means for sending air to said membrane bioreactor.

The invention also includes a method for treating produced water. The method involves separating volatile organic materials from produced water, thereby generating a contaminated first aqueous fraction, and sending the contaminated first aqueous fraction to a membrane bioreactor, thereby generating a first treated water product.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

The invention is concerned with the purification of produced water. Some aspects of the invention are concerned with a system for treating produced water. Other aspects of the invention are concerned with a method for treating produced water. The system and method are concerned with removing from produced water volatile organic compounds, semivolatile organic compounds, heavier hydrocarbons, oil, organic acids, paraffins, and wax. The system and method may be used for treating produced water from oil and gas ("O&G") wells, from coal beds used for methane production, and for treating other mined or industrial waters by removing dissolved organic and inorganic compounds and other materials from the water. It may be cost effective for O&G companies and other water users to use the system and method for decontamination of produced water or contaminated industrial water. In addition to lowering O&G production costs, the system and method may provide a water resource for industry and agriculture.

Figure 1:
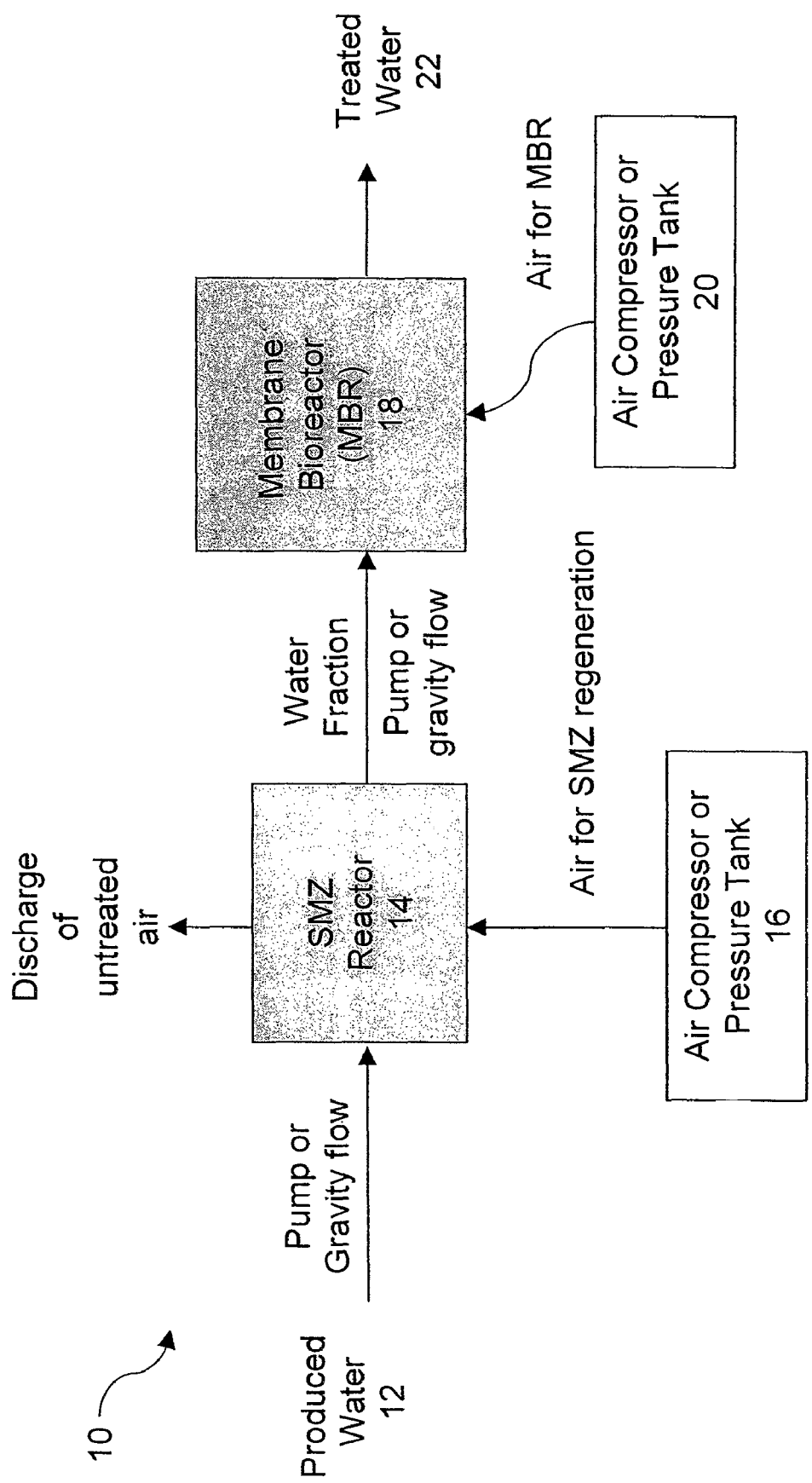
FIG. 1 shows a schematic illustration of an embodiment system for generating treated water from produced water.

Reference will now be made in detail to some embodiments of the invention, examples of which are illustrated in the accompanying drawings. Similar or identical structure will be labeled with identical callouts. Turning now to the Figures, FIG. 1 shows embodiment system 10, which is a system for treating produced water 12. System 10 includes SMZ reactor 14, which separates organic compounds, including BTEX, semivolatile hydrocarbons, and paraffins and waxes, from produced water 12. SMZ reactor 14 includes a filtration/sorption medium known in the art as surfactant-modified zeolite ("SMZ"). The SMZ removes organic compounds, including BTEX, semivolatile hydrocarbons, and paraffins and waxes, from produced water 12. The SMZ is produced using naturally occurring zeolites with sufficient permeability and surface charge, including clinoptilolite, heulandite, mordenite, analcime, natrolite, and phillipsite, among others. The SMZ is also bactericidal. Bactericidal SMZ does not support organic growth, so the use of SMZ minimizes any clogging that may result from bacterial growth within the filter medium. The SMZ is also an effective filter for particulate matter, such as iron floc. The SMZ reactor also can alter the cation composition of the produced water by, for example, exchanging unwanted calcium for sodium. The SMZ reactor can also sorb toxic oxyanions, such as chromate and arsenate, and can remove lead and other toxic cations. As a result of removing organic materials from produced water 12, a less-contaminated water fraction generated. The less-contaminated water fraction is sent to membrane bioreactor (MBR) 18 by gravity flow or by using a pump. MBR 18 further treats the less-contaminated water fraction by removing organic acids and other residual organic constituents. The product of the MBR treatment is Treated Water 22. System 10 also includes air compressor or pressure tank 16 that supplies air to SMZ reactor 14 for regenerating the SMZ when the SMZ becomes less effective at separating organic materials from produced water 12. This happens as the SMZ becomes saturated with the organic materials. Air compressor or pressure tank 16 may also be used for supplying air to MBR 18. Alternatively, a second air compressor or pressure tank 20 could supply air to MBR 18. SMZ reactor 14 of system 10 retains some of the organic materials from the produced water, and releases the volatile organic materials, such as BTEX, as a discharge. SMZ can be regenerated many times without much loss of sorption capacity. SMZ is easily regenerated to remove any buildup of heavier semivolatile and other non-polar organic compounds. SMZ can be regenerated by oxidation, heat, or by air stripping. Air stripping, also known as air sparging, involves draining the SMZ reactor and sending a flow of air from air compressor or pressure tank 14 through SMZ reactor 14. The volatile organic compounds desorb from the SMZ into the air stream and are removed with the air. Air compressor or pressure tank 16 provides air to SMZ reactor 14 for air stripping away these less volatile organic materials from the SMZ. These stripped away organic materials are also released from SMZ reactor 14 as a discharge. A heat treatment and resaturation with a moderate surfactant solution, or treatment using an oxidizer such as peroxide followed by resaturation with surfactant may also be used to regenerate SMZ by removing heavier hydrocarbons, waxes, and/or paraffins. Regenerated SMZ has very good permeability and sorptive capacity for at least 50 regeneration cycles.

Figure 2:
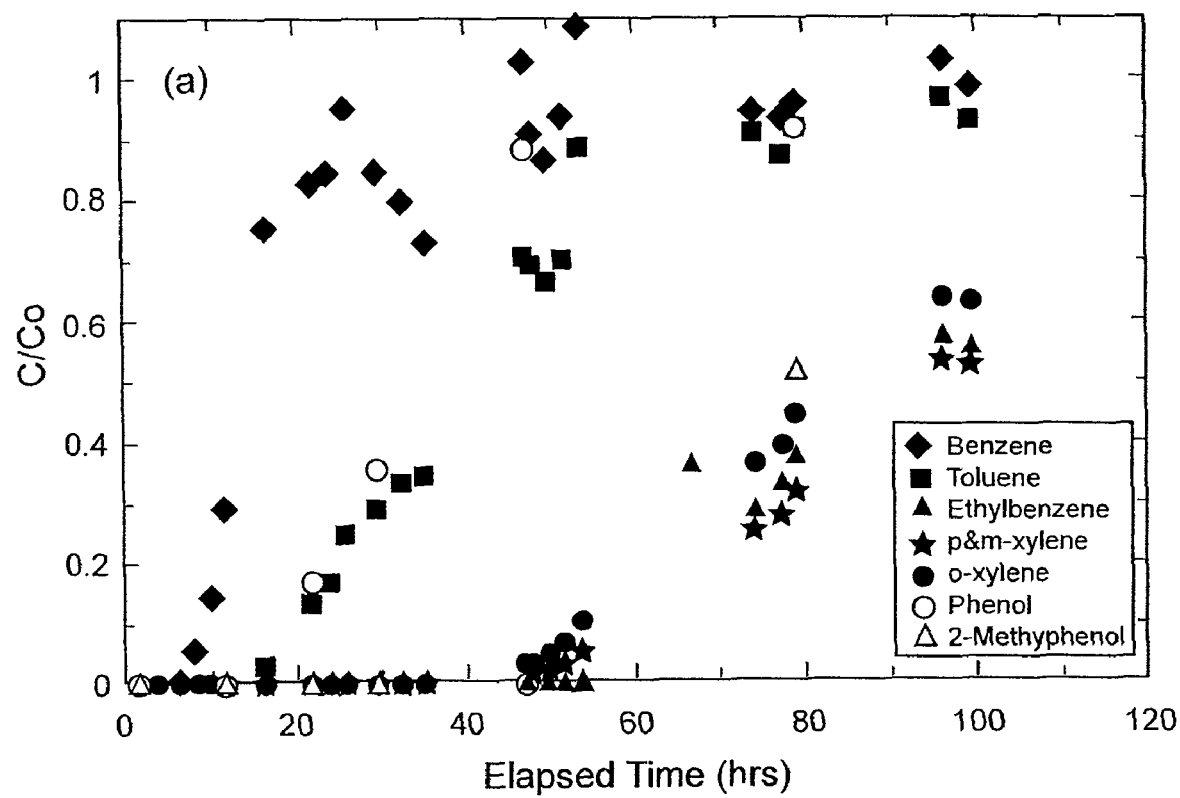
FIG. 2 shows a graph related to the removal of total VOCs, including BTEX and 2-methylphenol, from produced water entering a surface-modified zeolite ("SMZ") reactor of an embodiment system.

FIG. 2 shows a graph related to the removal of total VOCs, including BTEX and 2-methylphenol, from produced water entering a field test SMZ reactor of embodiment system 10. The flow rate into the SMZ reactor was 27 gallons per hour ("gph"). The initial concentration is "$C_0$", and the concentration at a later time is "C". The system progresses from 100% sorption (initial) to 0% (final). Complete breakthrough is 0% sorption, which happens when the SMZ stops sorbing; it is a measure of the performance of the system. Benzene sorbs the least, so breaks through the SMZ reactor the fastest. When benzene breaks through, it is time to regenerate the SMZ reactor. Breakthrough was only found for benzene, and it occurred at about 27 hours. All other VOCs sorbed more strongly. As benzene approaches a predetermined breakthrough concentration, the flow would be stopped and the SMZ reactor would be air sparged to regenerate the SMZ reactor.

Figure 3:
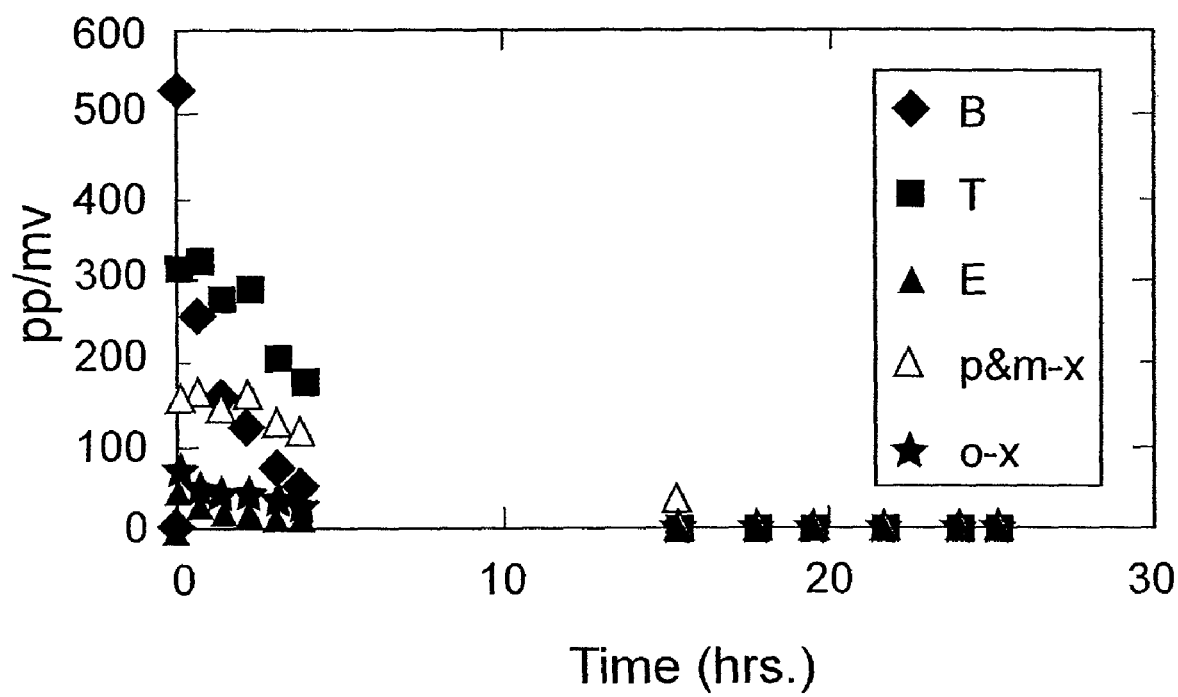
FIG. 3 shows a graph of BTEX concentration in sparged air from a field test SMZ reactor of an embodiment system.

FIG. 3 shows a graph of the concentration of BTEX in sparged air from a field test SMZ reactor for system 10 as VOCs from the SMZ reactor. As sparging continues the concentration of VOCs in air decreases until all VOCs are removed from the SMZ reactor.

Figure 4:
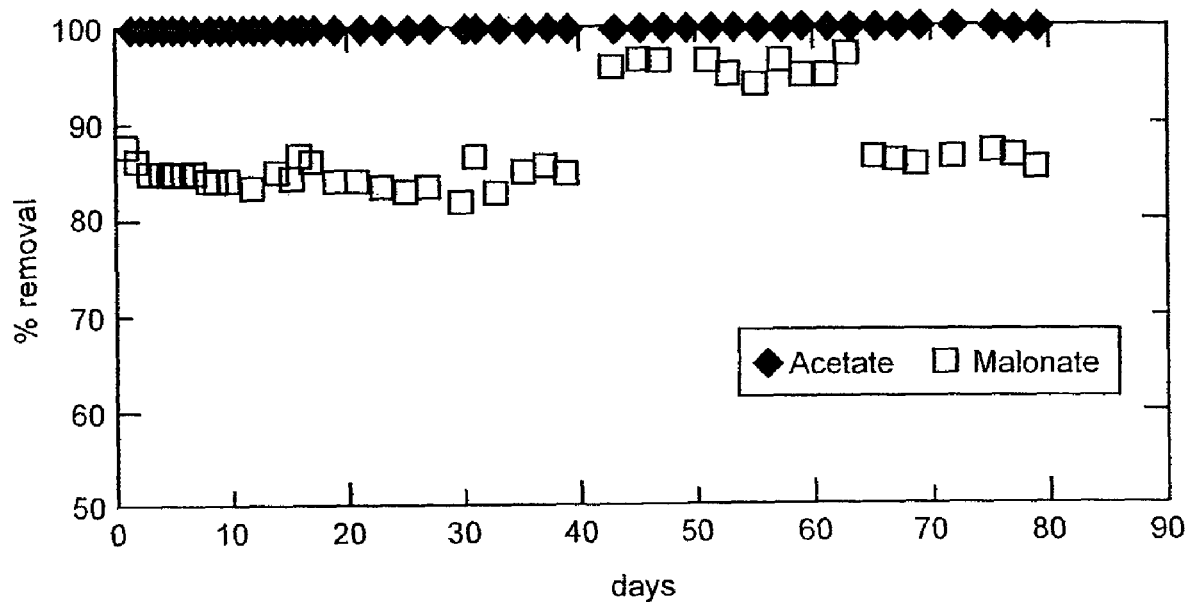
FIG. 4 shows a graph of acetate and malonate removal from a membrane bioreactor (MBR) of an embodiment system.

FIG. 4 shows a graph of percent removal of organic acids acetic acid and malonic acid, the two most commonly found in produced water, from a Membrane Bioreactor useful with embodiment 10. Hydraulic retention time is 9.6 hours. Malonic acid loading was 3427 milligrams per day ("mg/d"), and acetic acid loading was 5221 mg/d.

Figure 5:
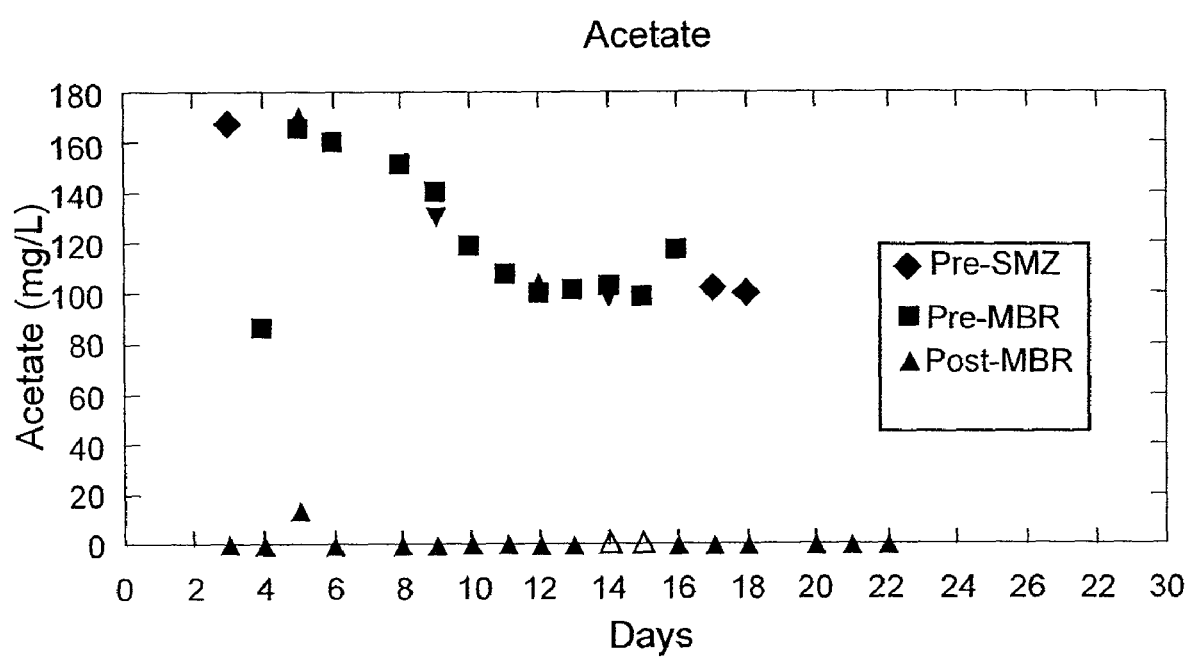
FIG. 5 shows a graph of removal of the most predominant acetate from produced water during a field test. Acetate was completely removed by the MBR.

FIG. 5 shows a graph of removal of acetic acid from produced water during a field test. The MBR completely removed the acetic acid.

Figure 6:
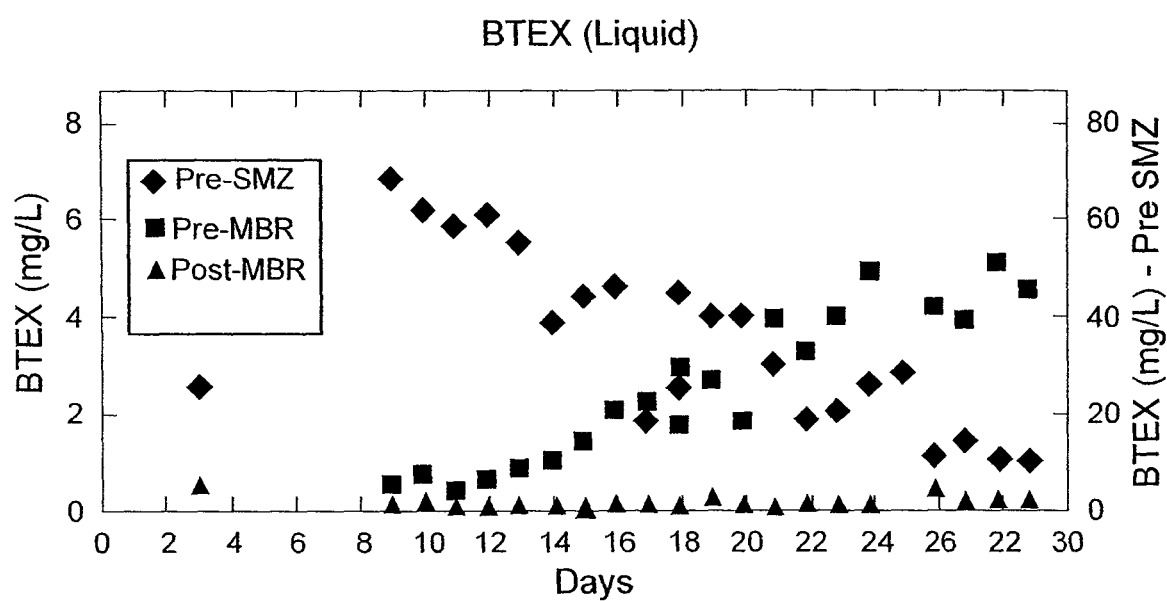
FIG. 6 shows a graph of change in concentration of BTEX (mg/L) concentrations in contaminated water before SMZ, after SMZ and before MBR, and after MBR, during August 2007 field test of embodiment system 10. BTEX was allowed to break through the SMZ in order to test the removal capability of the MBR. SMZ and MBR combined removal of BTEX yielded final concentrations close to zero.

FIG. 6 shows a graph of change in concentration of BTEX (mg/L) concentrations in produced water during a field test of embodiment system 10. The graph shows BTEX concentrations at various stages: before SMZ treatment, after SMZ treatment but before MBR treatment, and after MBR treatment. BTEX was allowed to break through the SMZ in order to test the removal capability of the MBR. SMZ and MBR combined removal of BTEX yielded final concentrations close to zero.

SMZ is prepared by modifying the surface of zeolites with surfactants. Some of these surfactants are commercially available. Modification of natural zeolites using surfactants dramatically alters their surface chemistry and allows them to adsorb cationic, anionic, and organic constituents of produced water. Some non-limiting examples of surfactants of the SMZ include cationic surfactants hexadecyltrimethylammonium bromide (abbreviated in the art as either HDTMA or CTAB), hexadecyltrimethylammonium chloride, and hexadecyltrimethylammonium hydrogen sulfate. Other examples of surfactants include those of the formula

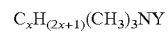

$$C_xH_{(2x+1)}(CH_3)_3NY$$

wherein x is from 1 to at least 19, and wherein Y is a counterion. Some non-limiting examples of counterions include bromide, chloride, and hydrogen sulfate. Other useful surfactants include, but are not limited to, triethylammonium bromide, trimethylammonium bromide, benzyltriethylammonium chloride, and other similar ring-type surfactants. Quaternary ammonium surfactants with benzene ring groups attached to a methyl group attached to the quaternary ammonium ion are also useful with the invention. Surfactants of the formula $C_xH_{(2x+1)}N(CH_3)_3Y$, wherein x=1–16 and wherein Y is any anion. A non-limiting list of anions includes bromide, chloride, and hydrogen sulfate. An example of such a surfactant has the formula $C_{32}H_{65}N(CH_3)_3Br$.

Figure 7:
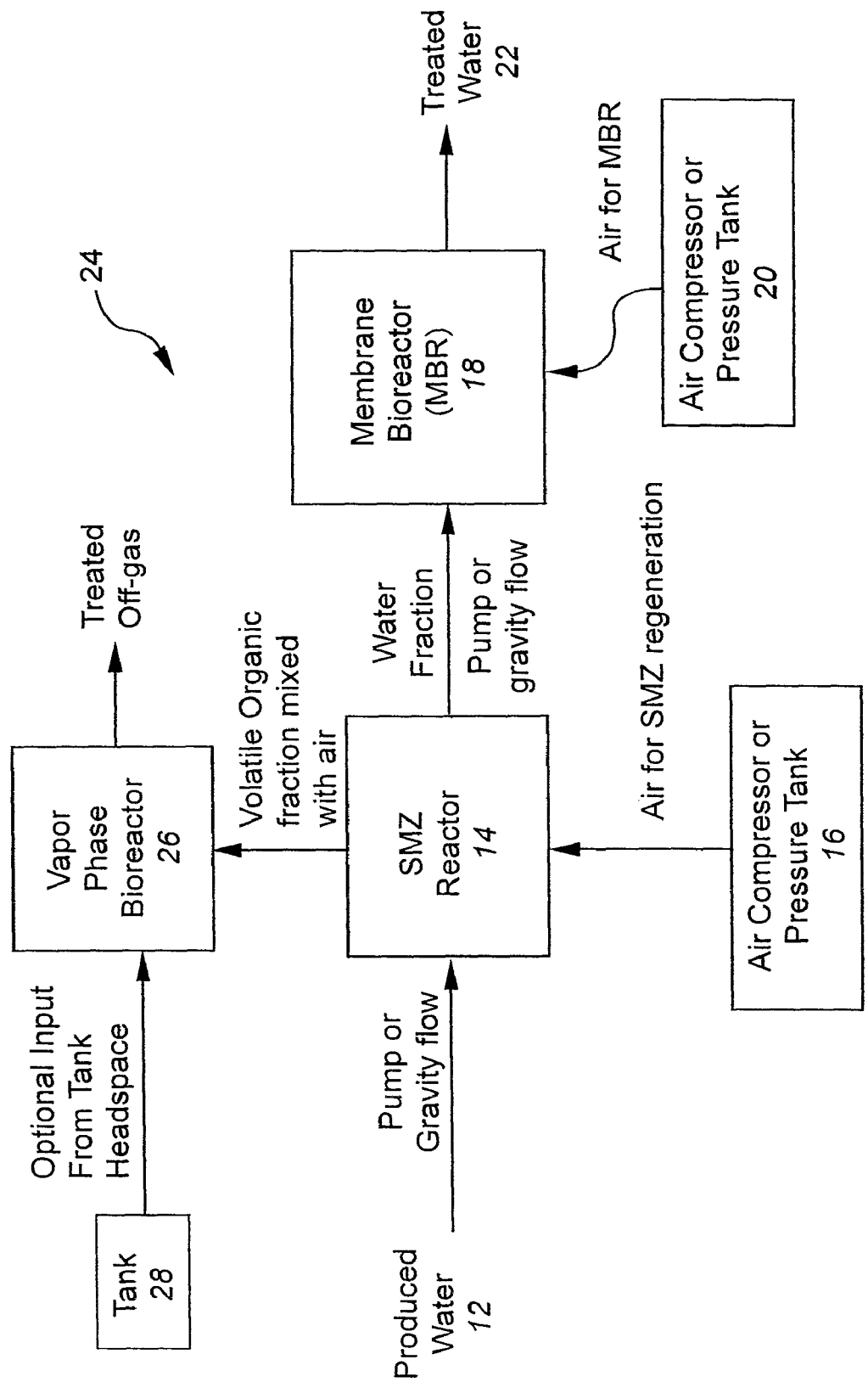
FIG. 7 shows a schematic illustration of a second embodiment system that is similar to first embodiment shown in FIG. 1 but that also includes a vapor phase bioreactor and a tank providing a continuous source of off-gas BTEX and other VOCs from produced water.

A second embodiment system 24 is shown in FIG. 7. System 24 includes all of the elements of system 10 shown in FIG. 1, with the addition of Vapor Phase Bioreactor ("VPB") 26 and tank 28. Vapor phase bioreactor 26 treats the volatile organic materials such as BTEX that are released from SMZ reactor 14. Tank 28 provides a continuous source of off-gas BTEX and other VOCs from produced water. The continuous feed of off-gas is helpful to the vapor phase bioreactor of the second embodiment system to help maintain microbial populations of the vapor phase bioreactor. It is also useful to field site operators to treat this off-gas rather than release it to the environment, as BTEX vapor is a greenhouse gas. During system 24 operation a vapor fraction and a liquid fraction exit SMZ reactor 14. The vapor fraction is produced by air stripping/sparging the SMZ at intervals during the system operation. This vapor fraction is sent to VPB 26. The liquid fraction is sent to MBR 18. VPB 26 converts volatile components such as BTEX to innocuous products such as $CO_2$ and water. This allows a user to dispose of VOCs in an environmentally sound manner. VPB 26 is effective at eliminating volatile organics because it is not significantly impacted by the water quality in the system. If the SMZ reactor includes two or more columns, then one of the columns can be sparged while the remaining column(s) continues to sorb organic compounds from the water fraction. MBR 18 removes organic acids (acetic acid, for example) and other residual organic constituents from the liquid fraction. Input concentrations are the high values shown on the left, output concentrations shown on the right. Final concentrations are near zero.

In practice, an example VPB 26 of system 24 may include organic packing material (peat, for example) inside a plastic or metal housing. The packing material is inoculated with biomass and nutrients. The packing material is coated with a stationary liquid film that includes the nutrients and biomass. VPB 26 allows air to flow through the biomass material. An air compressor or air tank 16 provides airflow through VPB 26. The biomass adsorbs BTEX from the air stream and uses the BTEX for food, releasing $CO_2$ and water as breakdown compounds. Water in the entering gas stream keeps the system moist. Off-gas from VPB 26 is determined by entry gas concentrations, environmental conditions, and the bacterial assemblage used in the biomass. The temperature of VPB 26 can be adjusted for colder climates or seasons, as needed. With maintenance of airflow from compressor 16, reasonable temperature control (no freezing conditions), and the addition of water vapor and trace nutrients, the biomass material can remove 99 percent or more of volatile organic materials from the influent air stream to VPB 26.

Another example VPB 26 includes synthetic packing such as silicon oxide pellets or plastic porous media inside of a plastic or metal housing. The packing material is inoculated with biomass and nutrients as described in the above paragraph and performs as described above.

Another example VPB 26 includes a plurality of stacked chambers that contain the biomass and packing materials. The biomass is adapted to metabolize VOCs such as BTEX.

System 24 optionally includes tank 28, which in practice may be local storage tanks having stored VOCs and H2S. These materials in headspace of tank 28 can be routed to VPB 26 during operations. Many O&G operations and industrial operations have storage tanks for waters that contain VOCs. These VOCs and $H_2S$ may be an environmental hazard if released, and therefore treatment of the headspace to remove the VOCs is desirable VPB 26 operates most efficiently when there is a continuous stream of VOCs routed to it. The headspace from the tanks provides this continuous stream between, and in conjunction with, the gases from the regeneration cycles for SMZ reactor 14.

Figure 8:
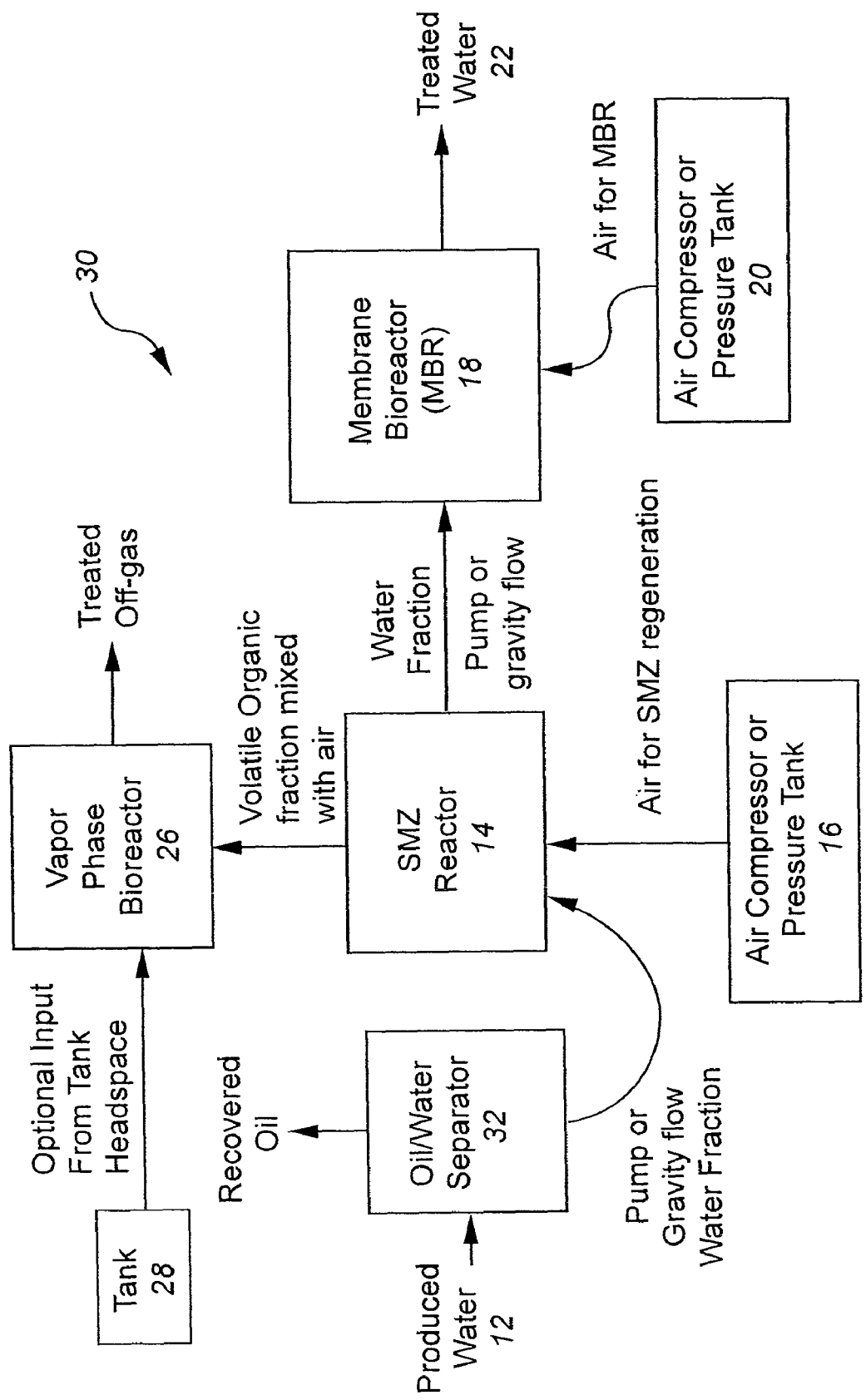
FIG. 8 a graph of removal of BTEX (in ppmv) from the inflow airstream to a vapor phase bioreactor ("VPB") over time for an embodiment system of FIG. 7. Input concentrations are the high values shown on the left, output concentrations shown on the right. Final concentrations are near zero.

FIG. 8 shows a third embodiment system 30. Embodiment system 30 of FIG. 8 includes all of the elements of system 24 shown in FIG. 7, with the addition of Oil/Water Separator 32, which separates oil from produced water 12 prior to SMZ treatment with SMZ reactor 14. Oil/Water separator 32 produces an oil fraction and a water fraction. The water fraction is sent to SMZ reactor 14 using a pump or by gravity flow. The water product from MBR 18 is Treated Water 34. Meanwhile, the recovered oil is pumped away.

Figure 9:
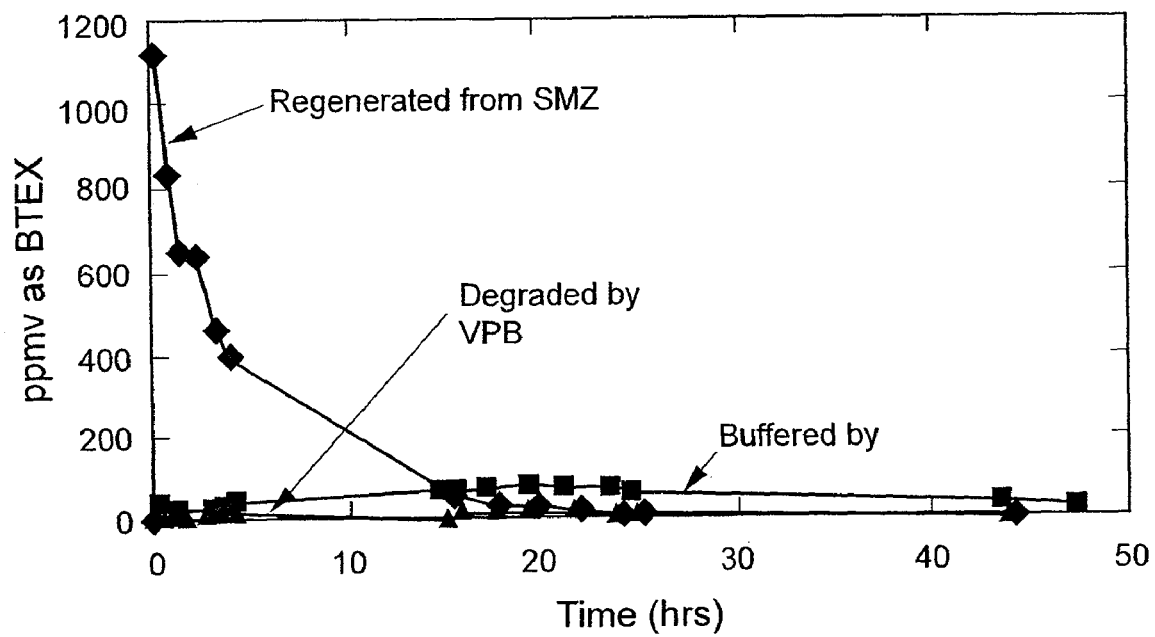
FIG. 9 shows a schematic illustration of a third embodiment system that is similar to the second embodiment shown in FIG. 7 but that also includes a separator for separating oil from the produced water.

A pilot plant scale system of embodiment 24 includes a temperature-controlled building outfitted with electrical power, gas chromatograph, and produced water feed. This embodiment system is designed to treat 500 liters of produced water per day. The system includes an oil/water separator and an SMZ reactor. The SMZ reactor includes having two or three canisters. Each canister is 36 inches in diameter, 72 inches in height, and filled with SMZ. Canisters are plastic 55-gallon drums with attached conduits. Canisters are similar to those used in a CULLIGAN water treatment system. Produced water is sent to the oil/water separator, and from the oil/water separator to the SMZ canisters of the SMZ reactor. Conduits are made from polyvinylchloride (PVC) pipe. Water can flow by gravity or can be pumped through the canisters. The canisters are connected in series with a bypass setup for use during regeneration. One of the canisters is automatically shut off and regenerated while produced water continues to flow by gravity or pumping through the other canisters. Regeneration is achieved by draining a canister followed by air sparging using an air compressor. In another less complicated embodiment, a bypass is not included; flow is stopped during regeneration. A product of regeneration is forced air containing volatile organic compounds (VOCs) such as BTEX. This air is routed to a VPB for treatment. An air compressor for the air venting may be 7.5 horsepower or greater and a bioreactor would measure from 6 inches diameter and 4 feet long up to three feet diameter by three feet long. Production size could easily be scaled up or down to facilitate different water purification needs. The SMZ reactor could have a flow rate of 0.5 gpm/ft$^2$, and almost a 100 percent removal rate for the BTEX and other compounds. This embodiment would be an inexpensive, low maintenance system that could easily be automated with a switching setup that automates a compressor to turn on and turn off. In an automated embodiment, off-gas could be routed via conduit(s) to the VPB. The time needed for air sparging would be determined by site-specific parameters such as loading factors, temperature, and the like. FIG. 9 shows removal of BTEX from a smaller version of this embodiment in a field test conducted in August 2007. The units "ppmv" mean parts per million per volume. TABLE 1 below shows data from this same test for removal of VOCs and SVOCs, total organic carbon ("TOC"), and oil and grease. The units are in parts per million ("ppm"). In TABLE 1, "ND" means not detected. In addition, in this field test, benzene was deliberately allowed to break through (i.e. it was not removed by SMZ) in order to determine whether the MBR could remove the benzene without the SMZ reactor acting as a buffer.

TABLE 1

| Contaminant | Amount of contaminant present in untreated produced water | Amount of contaminant present after SMZ treatment | Amount of contaminant present after SMZ and MBR treatment |
|---|---|---|---|
| Volatile Organics | | | |
| 2-Hexanone | 467 | 14.9 | 3.1 |
| 2-Butanone | ND | 365 | 104 |
| Benzene | 1070 | 2350[1] | 9.41 |
| 4-Methyl-2-pentanone | ND | 9.28 | ND |
| Carbon Disulfide | 153 | 79.6 | 3.63 |
| Chloroform | ND | ND | 4.87 |
| Chloromethane | ND | 1.28 | 3.15 |
| Trichloroethylene | ND | 32.3 | ND |
| Ethylbenzene | 458 | ND | 0.481 |
| Toluene | 4740 | 340 | 2.46 |
| Xylenes (total) | 4630 | 1.83 | 3.5 |
| Acetone | 2170 | 2340 | 1530 |
| Semi-Volatile Organics | | | |
| Phenol | 259 | 47.8 | ND |
| Fluorene | 3.9 | ND | ND |
| Naphthalene | 48.4 | ND | ND |
| 2-Methylnaphthalene | 56.9 | ND | ND |
| Phenanthrene | 3.85 | ND | ND |
| bis(2-Ethylhexyl)phthalate | 363 | ND | ND |
| m,p-Cresols | 105 | ND | ND |
| o-Cresols | 107 | ND | ND |
| TOC | 571 | 338 | 157 |
| Oil & Grease | 45.4 | ND | 6.84 |

[1]Allowed to break through on this test to verify MBR removal of Benzene

Figure 10:
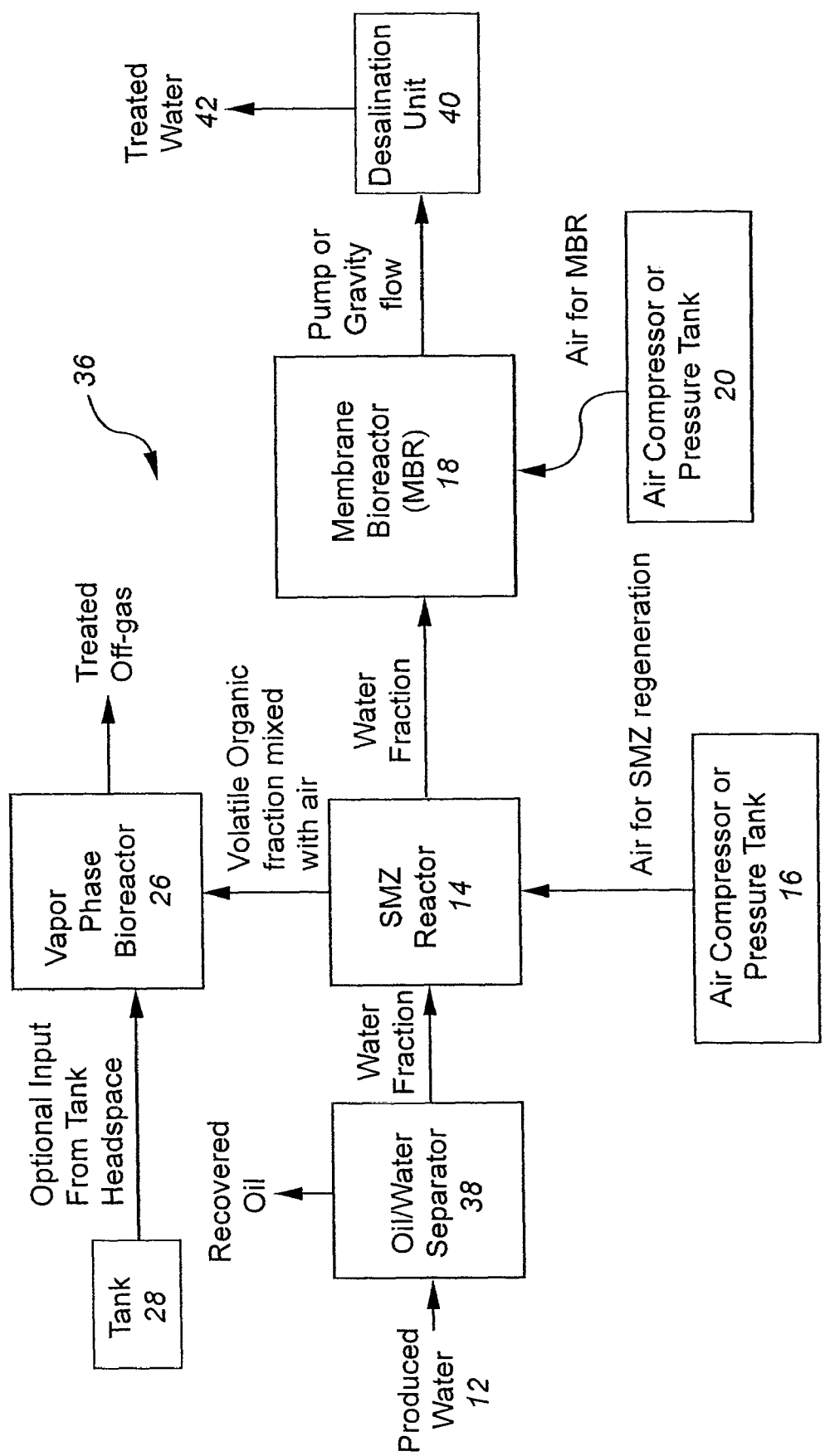
FIG. 10 shows a schematic illustration of a fourth embodiment system that is similar to the third embodiment shown in FIG. 9 but that also includes a desalination unit in fluid communication with the membrane bioreactor. The desalination unit may remove salt by reverse osmosis (RO).

FIG. 10 shows a fourth embodiment system 36. Embodiment system 36 includes all of the elements of system 24 shown in FIG. 9, which the addition of Desalination Unit 40, which receives water product from MBR and removes salts from this water product. Desalination Unit 40 can be, for example, a Reverse Osmosis ("RO") unit, or an RO unit in combination with a filtration unit such as an Ultrafiltration ("UF") unit. A UF unit does not desalinate but will remove other particulate constituents such as bacteria, to produce sterilized weighted brine for specific uses such as in well drilling operations. In practice, Desalination Unit 40 may include a plurality of thin film composite seawater membranes operating at 350-600 psig, or other membranes as appropriate. In a recent field test (August 2007) RO was used following SMZ treatment. The conductivity, which is a measure of salinity, was reduced from 922 milliSiemens to 526 microSiemens, greater than three orders of magnitude decrease and a result typical of or better than most drinking water. In addition, turbidity was decreased from 2.44 NTU to 0.46 NTU, again better than most drinking water.

Figure 11:
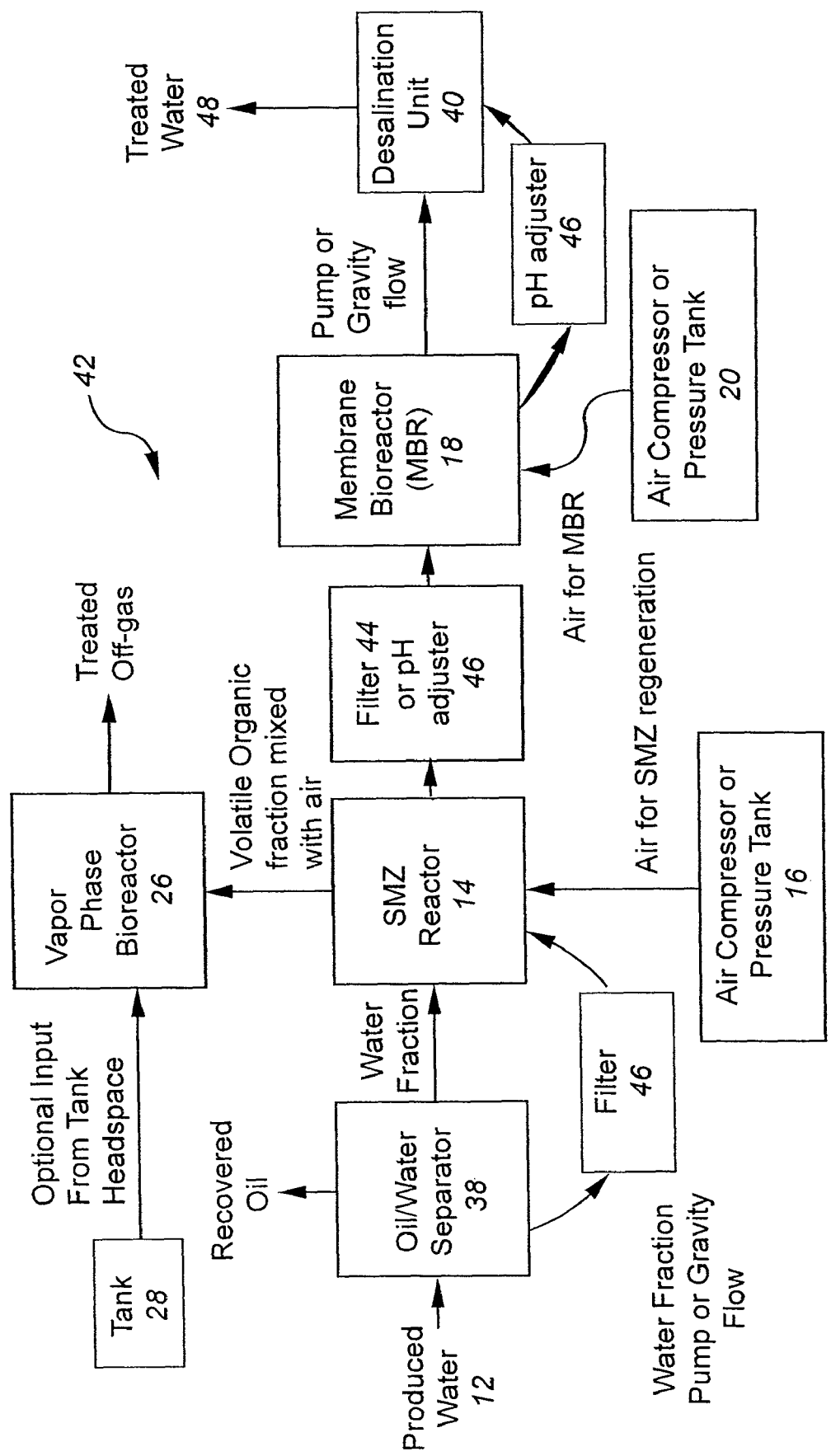
FIG. 11 shows a schematic illustration of a fifth embodiment system that is similar to the fourth embodiment shown in FIG. 10 but that also is includes additional filtering and pH adjusting elements.

FIG. 11 shows a fifth embodiment system 42 of the invention. Embodiment 42 includes all of the elements of system 24 shown in FIG. 10, with the addition of one or more filters and pH adjusters. Embodiment system 42 includes filter 44 in line between oil/water separator 38 and SMZ reactor 14. Embodiment system 42 also includes a filter 44 or a pH adjuster 46 in line between SMZ reactor 14 and MBR 18. Optionally, a pH adjuster 46 may also be in between MBR 18 and Desalination Unit 40. Filter 44 collects particulates and prevents clogging as a result of metals precipitation or other particulate matter. Filter 44 could be, for example, a filter capable of macrofiltration (>100 μm pore diameter), a filter capable of microfiltration (100 μm to 0.03 μm), or a filter capable of ultrafiltration (0.03 μm to 0.003 μm). pH adjuster 46 is a unit that meters acid, buffer, and/or base as needed in order to maintain an acid balance to prevent or at least minimize precipitation and/or assist the microbiological parts of system 42 and/or to prevent or at least minimize corrosion.

Some embodiment systems are especially useful for treating produced water that is very saline. Produced water having high salinity does not adversely affect sorption of organic materials to the SMZ. All of the embodiment systems can treat produced water that having very low salinity (1000 parts per million ("ppm") total dissolved solids) to very high salinity (30,000 ppm to more than 100,000 ppm total dissolved solids).

Embodiment systems of the invention may treat produced water more effectively than other systems. MBR systems alone allow for volatile organics to be released to the atmosphere, and are susceptible to variations in influent water quality. They are often not adjusted to remove organic acids, which is a process specific to this technology.

In summary, a system and method are used to remove contaminants from produced water. Free oil is removed using an oil/water separator. Organic compounds such as BTEX and SVOCs, residual oils, residual surfactants, paraffins, and waxes are removed using an SMZ reactor. The VOCs (BTEX) and $H_2S$ are converted to water, carbon dioxide, sulfate, and additional products using a Vapor Phase Bioreactor. After organic compounds are removed, the remaining water fraction is sent to a membrane bioreactor for additional decontamination and removal of organic acids before being subjected to reverse osmosis, ultrafiltration, or another salt removal process. It is anticipated that the treated water product of the embodiment water treatment systems and processes may be used in the O&G industry, the electric power industry, and possibly in other industries such as shipping (for de-oiling of bilge waters). Embodiment systems and methods of the invention may also be used to provide a water supply in arid and remote regions.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for treating contaminated water, comprising:
   a first reactor for separating volatile organic materials from the contaminated water, thereby generating a volatile organic fraction and a contaminated first aqueous fraction, said first reactor comprising an ionic surfactant-modified zeolite;
   a membrane bioreactor in fluid communication with said first reactor for generating a first treated water product from the contaminated first aqueous fraction; and
   means for sending air to said membrane bioreactor.

2. The system of claim 1, further comprising means for regenerating said ionic surfactant-modified zeolite of said first reactor.

3. The system of claim 1, further comprising a vapor phase bioreactor in fluid communication with said first reactor for treating the volatile organic fraction generated by said first reactor.

4. The system of claim 3, further comprising tank means in fluid communication with said vapor phase bioreactor for providing a source of volatile organic compounds to said vapor phase bioreactor.

5. The system of claim 1, further comprising a separator in fluid communication with said first reactor, said separator for removing oil from the contaminated water prior to separating volatile organic materials from the contaminated water by the first reactor.

6. The system of claim 5, further comprising pumping means for pumping contaminated water having less oil from the separator to the first reactor.

7. The system of claim 5, further comprising a filter in between the separator and the first reactor for filtering the contaminated water having less oil.

8. The system of claim 1, further comprising a desalination unit in fluid communication with said bioreactor for removing salt from the first treated water product, thereby generating a second treated water product.

9. The system of claim 8, further comprising a filter in between and in fluid communication with the first reactor and the membrane bioreactor for filtering the contaminated first aqueous fraction before it reaches the membrane bioreactor.

10. The system of claim 8, further comprising means in between and in fluid communication with the first reactor and the membrane bioreactor for adjusting the pH of the contaminated first aqueous fraction before it reaches the membrane bioreactor.

11. The system of claim 1, wherein said ionic surfactant of said ionic surfactant-modified zeolite comprises cationic surfactant.

* * * * *